(12) United States Patent
Hannemann

(10) Patent No.: US 11,422,668 B1
(45) Date of Patent: Aug. 23, 2022

(54) SEAMLESS APPLICATION UPDATES

(71) Applicant: Slack Technologies, Inc., San Francisco, CA (US)

(72) Inventor: Jan Hannemann, Victoria (CA)

(73) Assignee: Slack Technologies, LLC, San Francisco, CA (US)

( * ) Notice: Subject to any disclaimer, the term of this patent is extended or adjusted under 35 U.S.C. 154(b) by 8 days.

(21) Appl. No.: 17/213,607

(22) Filed: Mar. 26, 2021

(51) Int. Cl.
*G06F 3/0481* (2022.01)
*G06F 8/656* (2018.01)

(52) U.S. Cl.
CPC ............ *G06F 3/0481* (2013.01); *G06F 8/656* (2018.02)

(58) Field of Classification Search
CPC .............................. G06F 3/0481; G06F 8/656
See application file for complete search history.

(56) References Cited

U.S. PATENT DOCUMENTS

| | | | | |
|---|---|---|---|---|
| 2006/0184891 A1* | 8/2006 | Parker | ................... | G06F 3/0481 715/767 |
| 2013/0104114 A1* | 4/2013 | Reiss | ........................ | G06F 8/65 717/170 |
| 2017/0083166 A1* | 3/2017 | Chen | ........................ | G06F 9/485 |
| 2017/0330248 A1* | 11/2017 | Gomariz | ............... | G06F 3/0481 |
| 2018/0287982 A1 | 10/2018 | Draeger et al. | | |
| 2018/0365003 A1* | 12/2018 | Dong | ....................... | H04L 67/34 |

OTHER PUBLICATIONS

"Die, Email, Die! A Flickr Cofounder Aims To Cut US All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

(Continued)

*Primary Examiner* — Mong-Shune Chung
(74) *Attorney, Agent, or Firm* — Erise IP, P.A.

(57) ABSTRACT

Media, methods, and systems are disclosed for seamlessly updating a current version of a native application with an updated version of the native application. A data package associated with the updated version is received. Current version window display parameters including a current window display size, a current window display position, and a current window display layer are received. The updated version of the native application is initialized while hidden beneath the current window display layer and continuously adjusted so that any viewable portion of the updated version of the native application remains hidden by the current version. Finally, the current version is terminated, thereby visibly replacing the current version of the native application without interrupting a seamless user experience.

20 Claims, 5 Drawing Sheets

(56) References Cited

OTHER PUBLICATIONS

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PANDODAILY, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

SEAMLESS APPLICATION UPDATES

TECHNICAL FIELD

Embodiments of the invention relate to seamlessly updating applications. More specifically, embodiments of the invention relate to updating a version of an application executable without interrupting use of the application being upgraded.

Native applications need to be updated from time to time to add new or improved features, fix bugs, and provide security updates. In some cases, to update an application, a user removes an out-of-date native application from the user's computer system and installs an updated version of the out-of-date application. In some instances, an installer associated with an updated version of a native application will first remove the out-of-date application and then install the new version. Some applications have a feature by which a currently running application will periodically poll a server associated with the application vendor to check for new versions or receive push notifications from the application vendor indicating new versions. When there is a new version, the currently running application may provide a prompt or other visual indication to a user that an update is available. The user can then activate the prompt to install the update. However, to install the update, the currently running out-of-date application has to be shut down, which is disruptive to a user's workflow. Accordingly, there is a need for an automatic update that is seamless and invisible to the user, so that the user is always running a most up-to-date version of a native application, and the update does not interfere with the user's work.

SUMMARY

Embodiments of the invention address the above-identified problems by providing a mechanism for updating a version of an application executable without interrupting use of the application to be upgraded. In particular, a new version of the application is download, installed and launched behind the currently running version so that the user can quickly be switched to the new version at a convenient point.

In particular, in a first embodiment, the invention includes one or more non-transitory computer-readable media storing computer-executable instructions that, when executed by a processor, perform a method for seamlessly updating a current version of a native application with an updated version of the native application, the method comprising: in response to determining availability of an update to the current version of the native application, receiving a data package associated with the updated version of the native application, the data package comprising a new native application executable, accessing, from a user interface environment, current version window display parameters associated with the current version of the native application, the current version window display parameters including a current window display size, a current window display position, and a current window display layer, based on the current version window display parameters, launching the updated version of the native application in a window that is positioned beneath the current window display layer and not visible to the user, and in response to detecting user inactivity in the current version of the native application, terminating execution of the current version of the native application, so that the updated version of the native application becomes visible, thereby replacing the current version of the native application within the user interface environment.

In a second embodiment, the invention includes a method for seamlessly updating a current version of a native application with an updated version of the native application, the method comprising: in response to determining availability of an update to the current version of the native application, receiving a data package associated with the updated version of the native application, the data package comprising a new native application executable, accessing, from a user interface environment, current version window display parameters associated with the current version of the native application, the current version window display parameters including a current window display size, a current window display position, and a current window display layer, based on the current version window display parameters, launching the updated version of the native application in a window that is positioned beneath the current window display layer and not visible to the user, and in response to detecting user inactivity in the current version of the native application, terminating execution of the current version of the native application, so that the updated version of the native application becomes visible, thereby replacing the current version of the native application within the user interface environment.

In a third embodiment, the invention includes a system comprising at least one processor and at least one non-transitory memory storing computer executable instructions that when executed by the processor cause the system to carry out actions comprising: in response to determining availability of an update to a current version of a native application, receiving a data package associated with the updated version of the native application, the data package comprising a new native application executable, accessing, from a user interface environment, current version window display parameters associated with the current version of the native application, the current version window display parameters including a current window display size, a current window display position, and a current window display layer, based on the current version window display parameters, launching the updated version of the native application in a window that is positioned beneath the current window display layer and not visible to the user, and in response to detecting user inactivity in the current version of the native application, terminating execution of the current version of the native application, so that the updated version of the native application becomes visible, thereby replacing the current version of the native application within the user interface environment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
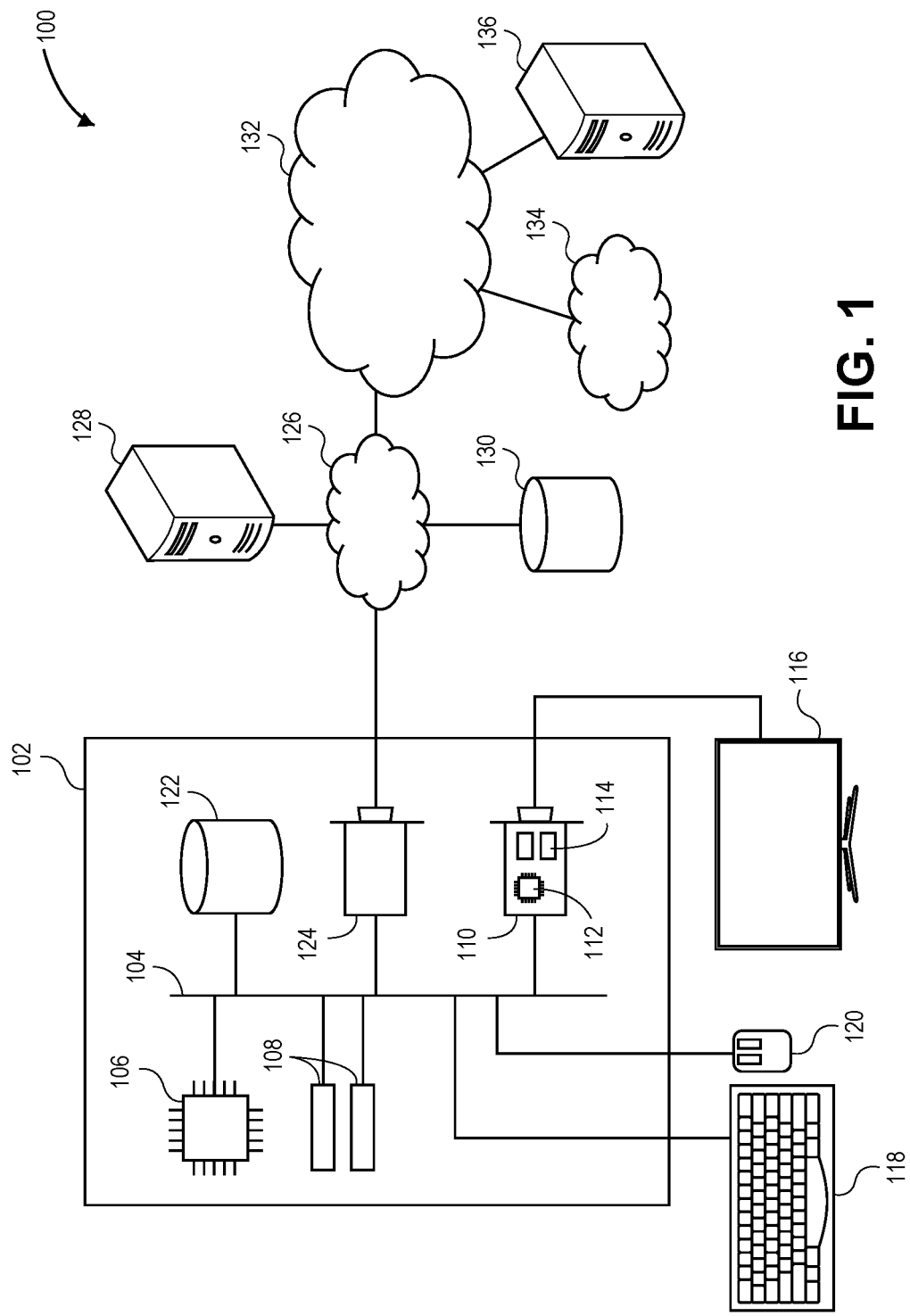
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
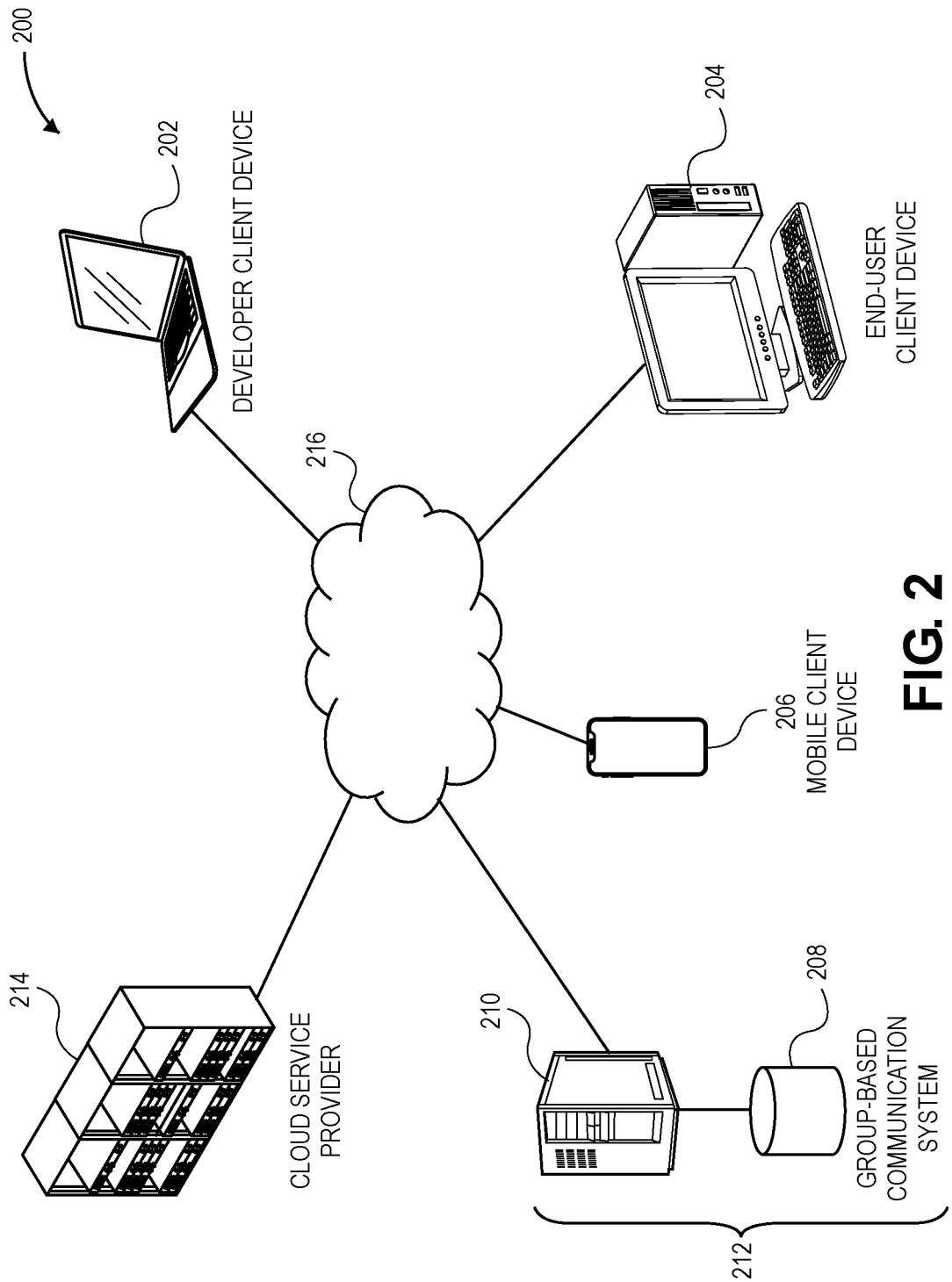
FIG. 2 depicts components of a system for carrying out embodiments of the invention.

Turning now to FIG. 2, an exemplary diagram illustrating components of a system for carrying out embodiments of the invention is depicted and referred to generally by reference numeral 200. System 200 provides a platform for interacting with one or more online applications. System 200 includes any number of client devices such as end-user client device 204, mobile client device 206, and developer client device 202. An individual user may connect to components of system 200 using a single client device or multiple client devices, either concurrently or sequentially. Similarly, in some embodiments, multiple users may share (concurrently or sequentially) a single client device to access the online applications. As depicted in FIG. 2, client devices may be any form of computing device discussed above with respect to FIG. 1. In particular, a user may access components of system 200 using a desktop, a laptop, or a mobile device. Components of system 200 may be accessible via dedicated software of a particular client device or via a web browser associated with the client device. In some embodiments, developers and application hosting system administrators can access administrative functionality via any client device. In other embodiments, administrative functions can only be accessed from a limited subset of client devices (for example, only via developer client device 202). In some embodiments, group-based communication system 212 is a channel-based messaging platform that can host a multiplicity of group-based communication system servers and group-based communication data stores such as group-based communication system server 210 and group-based communication data store 208.

In some embodiments, group-based communication system 212 provides services in connection with group-based communication system server 210. Group-based communication system server 210 may be a dedicated server, a shared server, a virtual machine instance in a cloud computing environment, or any other form of computing device discussed above with respect to FIG. 1. Although a single group-based communication system server 210 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons.

Cloud service provider 214 represents an on-demand cloud computing platform providing data storage and computing resources in the form of dedicated servers, shared servers, virtual machine instances in a cloud computing environment, or any other form of computing device discussed above with respect to FIG. 1. Cloud service provider 214 may provide software as a service (SaaS), infrastructure as a service (IaaS) or platform as a service services (PaaS), including serverless execution in an event-driven serverless execution environment. In some embodiments, application updating operations may be performed in connection with cloud service provider 214. Online application functionality may also be provided in connection with cloud computing resources provisioned by cloud service provider 214.

Group-based communication system server 210 is communicatively coupled to client devices 202, 204, and 206 as well as cloud service provider 214 via network 216. Network 216 may be a local area network (LAN), wide-area network (WAN), virtual private network (VPN) or the Internet. Broadly speaking, any type of network for providing communication between the various components of system 200 is contemplated. Group-based communication system server 210 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 208 is communicatively connected to group-based communication system server 210. As depicted, group-based communication system data store 208 is directly connected to group-based communication system server 210; however, any form of communicative connection (for example, network-attached storage (NAS), a network file system (NFS), or cloud-based storage) can be employed. Broadly speaking, group-based communication system data store 208 stores all of the durable information used by group-based communication system server 210. For example, group-based communication system data store 208 may store all of the messages with their associated channels, documents and images uploaded to particular channels, channel membership information, and/or user information. As previously discussed, multiple group-based communication system servers may be present in system 200. In such embodiments, each group-based communication system server may have its own copy of group-based communication system data store 208. Alternatively, multiple group-based communication system servers may share a single network-attached group-based communication system data store. Alternatively, or in addition, in any of these embodiments, data may be sharded across multiple group-based communication system data stores. An overall corpus of group-based communication content contained within one or more group-based communication system data stores is referred to as a group-based communication system repository.

Figure 3:
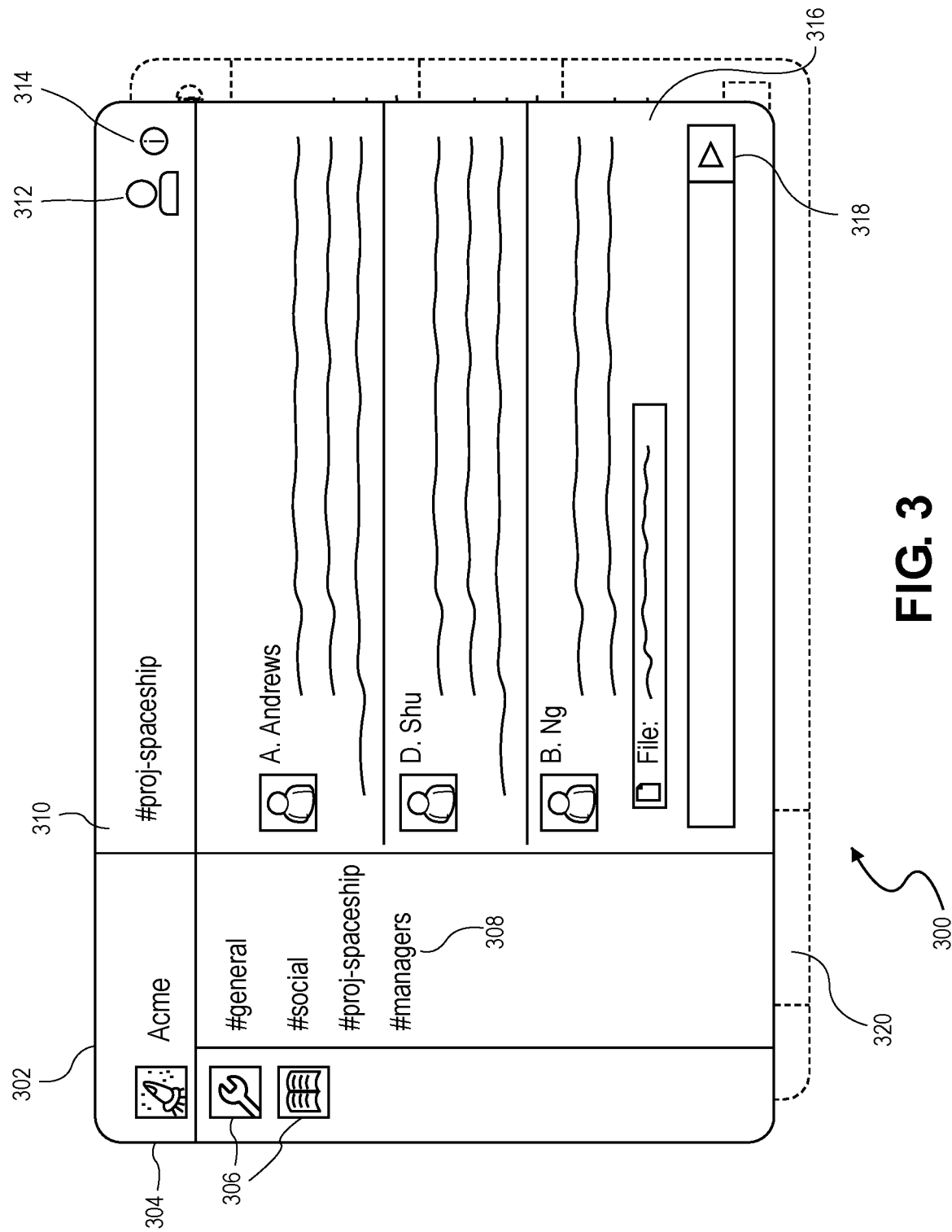
FIG. 3 depicts a current version user interface of a group-based communication system client native application that is in process to be updated consistent with certain embodiments of the invention.

Turning now to FIG. 3, a current version user interface 300 is depicted for carrying out embodiments of the invention. Current version user interface 300 depicts an exemplary group-based communication system client user interface viewing a channel in a group-based communication system for collaboration among a group of users (also known as members of the channel). The group-based communication system client user interface functions as a front end of a group-based communication system client application. Users of the group-based communication system can post messages at any point in time, and other members can view them at their leisure, either in real-time or when they next visit the particular channel of the group-based communication system. This has the advantage that users can focus on particular tasks without being distracted by the need to constantly monitor real-time communications.

As depicted, current version user interface 300 includes a navigation pane 302 for navigating the group-based communication system. For example, navigation pane 302 may include an organization label 304 with one or more workspace labels to allow the user to switch between different organizations using the group-based communication system and different workspaces within an organization. For example, a user may belong to one instance of the group-based communication system associated with their employer and a second instance associated with a volunteer organization to which the user belongs. Within the employer's organization, separate workspaces may exist for product development and product support. The user can switch between organizations by clicking on the organization label 304 and switch between workspaces with the selected organization using workspace labels 306. Finally, within a workspace, communications may be divided up into channels, with each channel devoted to a particular topic. In some embodiments, current version user interface 300 includes channel list 308 to which the user has subscribed or to which the user has access, and the user can switch the current channel view to any channel by selecting that channel in the list. In some embodiments, channel list 308 may provide an indication that a particular channel (or channels) contains unread messages or messages that contain updates or updated thread(s) associated with a particular message. Thus, navigation pane 302 allows a user to easily select a channel across different organizations and workspaces. In addition to and optionally below channel list 308 may be presented a list (not shown) of direct messages between one or more users of the group-based communication system. For the purposes of the present disclosure, a direct message communication channel functions analogously to a channel with members individually and manually specified by an initiating user.

Current version user interface 300 also includes channel display 316. Channel display 316 includes information relevant to the user's currently selected channel. For example, channel display 316 may include channel header 310, which displays metadata for the currently selected channel, including channel name, channel membership, and channel topic. Channel header 310 may also include controls 312 and 314 for adding new members to the channel, displaying additional information about the channel, administering the channel, or other channel functions. In some embodiments, controls 312 and 314 may be located elsewhere in channel header 310. In some embodiments, channel display 316 displays the messages posted in the channel by the members of the channel, notifications for the channel, and other channel data. As depicted, channel display 316 shows the most recent messages posted by channel members; however, in some embodiments, messages may be searchable, sortable, and/or scrollable within channel display 316. Finally, channel display 316 may include a message input box 318 allowing users to post messages to the message display for communication to other channel members.

In some embodiments, state information associated with the current version user interface is stored and an external location (such as a cache) accessible to subsequent instances of the current version user interface or the new version user interface. For example, draft (or not-yet-sent) messages composed in connection with message input box 318 may be persisted in client-device cache files in a file system associated with the group-based communication system client application. In these embodiments, numerous aspects regarding configuration of current version user interface 300 may be persisted in similar cache files. Such user interface aspects may include, for example, which is the currently active workspace as designated in connection with workspace labels 306. Other saved user interface aspects include which channel is currently selected out of channel list 308, and which position within channel display 316 is scrolled to. Persisting these and similar aspects in cache files has the advantage of allowing a user of a group-based communication system to close an associated client application and pick up where the user left off when the client application is opened again. Use of such cache files has an added advantage of allowing a current version of a native application to record its state and permit an updated version of the native application to take over execution with an identical state to that of the previously current version of the native application.

In some embodiments, once an updated version of a native application has been downloaded to a client device running a current version of the native application, the updated version is installed. Installation of an updated version of the native application may entail extracting the updated version from a download data package, the data package having as contents at least an executable file corresponding to the updated version of the native application. In these embodiments, the installed updated version of the native application is then executed with parameters corresponding to current version window display parameters. The current version window display parameters correspond to where and how within the display of the client device a window for rendering the current version of the native application is displayed. The current window parameters may include, for example, a current window display size, a current window display position, and a current window display layer.

Current version user interface 300, corresponding to a native application, may be seamlessly upgraded while a user interacts with the corresponding group-based communication system client as it is running, as described herein. Updated version user interface 320 is an updated version of current version user interface 300 and has been downloaded to the group-based communication system client device and installed onto a file system associated with the client device. Installation of an updated version of a native application may entail extracting the updated version from a download data package, and once installed updated version executes, positioning itself directly behind (and therefore hidden by) current version user interface 300 in a display layer behind a current window display layer on which current version user interface 300 is displayed.

In some embodiments, updated version user interface 320 subscribes to events corresponding to moving, resizing, and all input events received by current version user interface 300. In these embodiments, if current version user interface 300 moves, for example by a user clicking on an associated window header bar and dragging the window to a new position, current version user interface 300 will transmit corresponding information regarding repositioning of the window, and seamlessly, updated version user interface 320 will reposition itself so that it remains hidden by current version user interface 300. Similarly, if a resize operation is performed on current version user interface 300, updated version user interface 320 may receive corresponding information regarding the resize operation and cause a corresponding resize operation to be performed on itself. In some embodiments, updated version user interface 320 may obtain such information directly from the operating system of the client device. In some other embodiments, updated version user interface 320 may obtain such information from current version user interface 300 by way of any inter-process or inter-application communication mechanism. Such communication mechanisms include shared memory mechanisms, shared pipes, or other operating-system-provided, inter-process messaging systems.

Similarly, any input events received by current version user interface 300 are also received and processed at updated version user interface 320, which receives corresponding information regarding any input events, and processes the input events accordingly. In some embodiments, underlying group-based communication system client cache files are updated in coordination with current version user interface 300. In some embodiments, updated version user interface 320 may obtain such information directly from the operating system of the client device. In some other embodiments, updated version user interface 320 may obtain such information from current version user interface 300, or by monitoring the internal state cache in real time. As noted above, all such communication may occur through various means of inter-application or inter-process communication.

In some embodiments, when current version user interface 300 and/or updated version user interface 320 detects user inactivity, current version user interface 300 terminates and removes itself from the display, leaving updated version 320 as the active user interface. Since updated version user interface 320 has been receiving and updating itself with all user inputs that current version 300 had received, updated version user interface 320 appears to the user to be identical to current version 300 with the exception that the underlying native application executable has been updated. In some embodiments, updated display features may be present but the interactive user experience to the user will have been seamless up to the point of keystroke input and display rendering as well as scrolling and/or mouse or stylus input.

In some embodiments, a visual snapshot view of current version user interface 300 is taken immediately before terminating current version user interface 300. In these embodiments, for a brief period between terminating current version 300 and when updated version user interface 320 resumes execution and processing of user input events that had previously been handled by current version user interface 300, a modified version of the snapshot is displayed indicating that the application is being updated. For example, the snapshot may be blurred and/or a "loading" animation superimposed upon the snapshot. Once updated version user interface 320 is ready to receive input, the modified snapshot is removed from display and updated version user interface 320 takes over receiving and processing input events.

Figure 4:
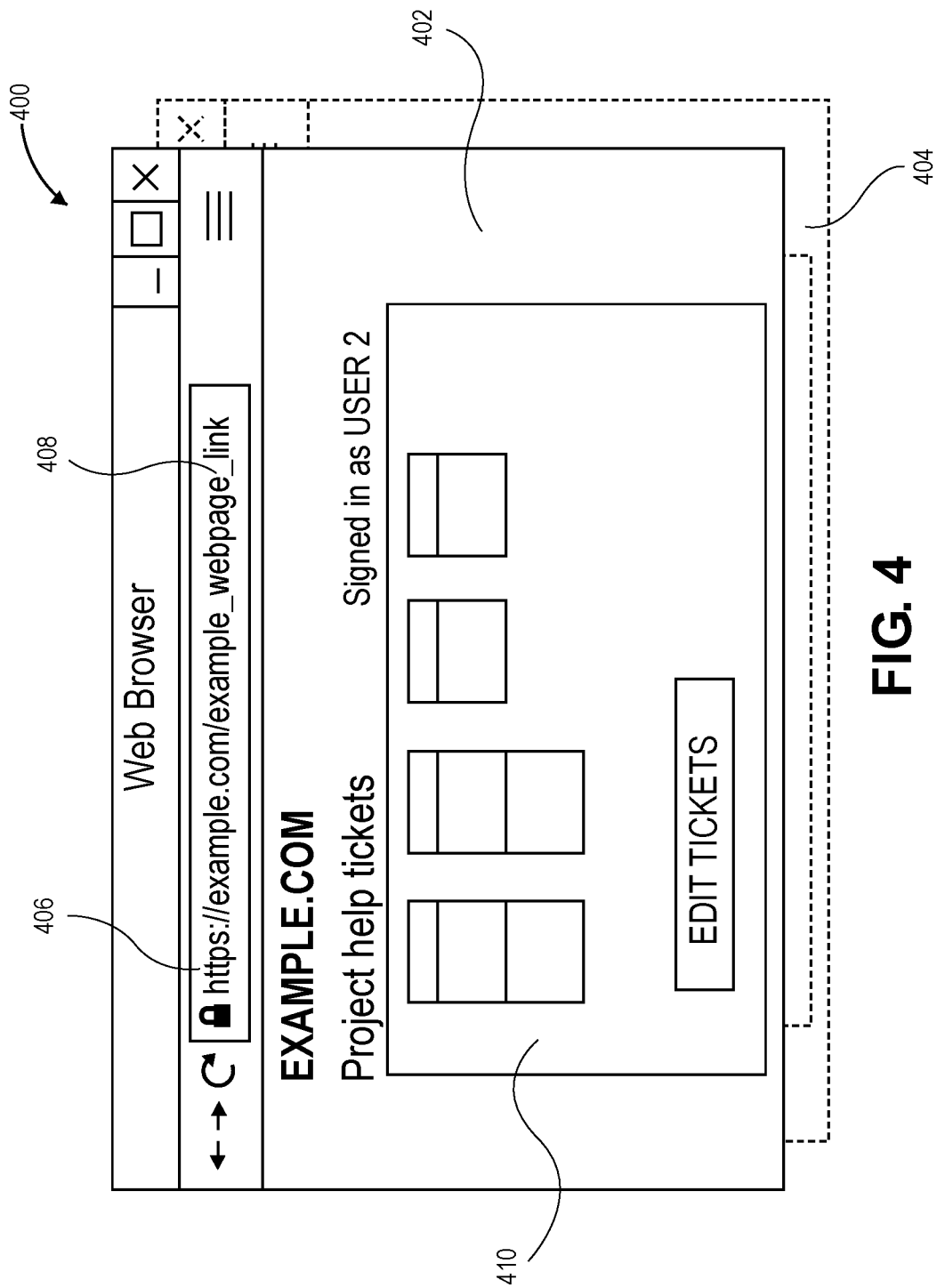
FIG. 4 depicts a user interface of a web browser native application that is in process to be updated consistent with certain embodiments of the invention.

Turning now to FIG. 4, a user interface 400 of a web browser native application is depicted for carrying out embodiments of the invention. Address bar 406 contains a uniform resource locator (URL) associated with hyperlink 408 that is used to access a web resource, as shown. In the illustrated example, the web resource may be a ticket project in connection with a ticketing web application. Accordingly, current version web browser 402 may display project information 410 associated with the ticketing project. Current version web browser 402, a native application, may be seamlessly upgraded while a user interacts with a web application running in current version web browser 402. Updated version web browser 404 is an updated version of current version web browser 402 and has been downloaded to a client device and installed onto the client device. As noted above, installation of an updated version of a native application may entail extracting the updated version from a download data package, and once installed updated version web browser 404 executes, positioning itself directly behind and hidden by current version web browser 402 in a layer behind a current window display layer on which current version web browser 402 is displayed.

In some embodiments, updated version web browser 404 subscribes to events corresponding to moving, resizing, and all input events received by current version web browser 402. In these embodiments, if current version web browser 402 moves, for example by a user clicking on an associated window header bar and dragging the window to a new position, current version web browser 402 will transmit corresponding information regarding repositioning of the window, and seamlessly, updated version web browser 404 will reposition itself so that it remains hidden by current version web browser 402. Similarly, if a resize operation is performed on current version web browser 402, updated version web browser 404 will receive corresponding information regarding the resize operation and cause a corresponding resize operation to be performed on itself. In some embodiments, updated version web browser 404 may obtain such information directly from the operating system of the client device. In some other embodiments, updated version web browser 404 may obtain such information from current version web browser 402.

Similarly, any input events received by current version web browser 402 are also received and processed at updated version web browser 404, which receives corresponding information regarding any input events, and processes the input events accordingly. In some embodiments, underlying cache files are updated in coordination with current version web browser 402. In some embodiments, updated version web browser 404 may obtain such information directly from the operating system of the client device. In some other embodiments, updated version web browser 404 may obtain such information from current version web browser 402. As noted in connection with FIG. 3 above, all such communication may occur through various means of inter-application or inter-process communication.

In some embodiments, when current version web browser 402 and/or updated version web browser 404 detects user inactivity, current version web browser 402 terminates and removes itself from the display, leaving updated version 404 as the new native application rendering the active web application. Since updated version web browser 404 has been receiving and updating itself with all user inputs that current version 402 had received, updated version web browser 404 appears to the user to be identical to current version 402 with the exception that the underlying native application executable has been updated. In some embodiments, updated display features may be present but the interactive user experience to the user will have been seamless up to the point of keystroke input and display rendering as well as scrolling and mouse or stylus input.

In some embodiments, a visual snapshot view of current version web browser 402 is taken immediately before terminating current version web browser 402. In these embodiments, for a brief period between terminating current version 402 and when updated version web browser 404 resumes execution and processing of user input events that had previously been handled by current version web browser 402 a modified version of the snapshot is displayed indicating that the native application (browser) is being updated. As described above, the modification may include blurring the snapshot and/or superimposing a "loading" animation over the snapshot. Once updated version web browser 404 is ready to receive input the modified snapshot is removed from display and updated version web browser 404 takes over receiving and processing input events.

Figure 5:
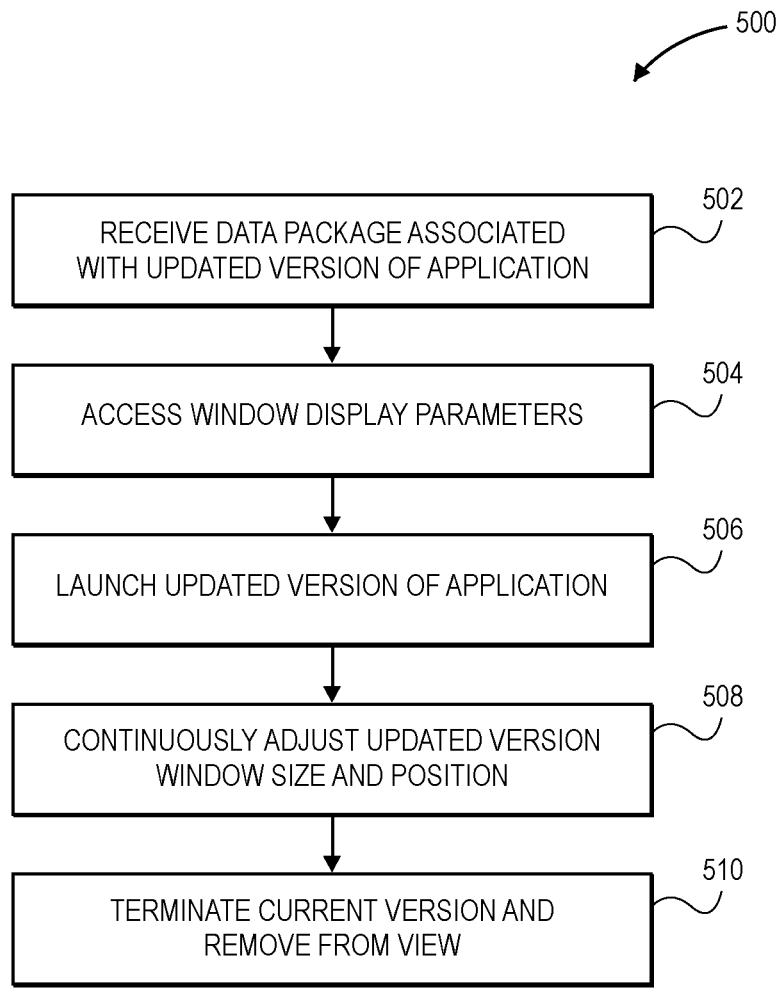
FIG. 5 depicts an exemplary flowchart for illustrating the operation of a method in accordance with one embodiment of the invention.

Turning now to FIG. 5, an exemplary flow chart 500 is depicted for illustrating the operation of a method in accordance with one embodiment of the invention. At step 502, a data package associated with the updated version of the native application is received. The data package may include at least a new native application executable. Alternatively or in addition, the data package may include computer-executable instructions in uncompiled form that are subsequently compiled into executable form by the client device. In some embodiments, the data package also includes updated application configuration information such as configuration information relating to new features associated with the native application. The updated configuration information may include new version of configuration files or altogether new and additional configuration files. In some embodiments prior to receiving the data package, a current version of a native application checks with an update source associated with the native application in order to determine availability of an update to the current version of the native application. In some embodiments, this involves making an authenticated API call to a server associated with an organization that is an official provider of the native application.

Next, at step 504, current version window display parameters and/or internal state information for the running application are accessed. In some embodiments, the current version of the native application retrieves internal state information directly from the native application. In other embodiments, internal state information is retrieved from a serialized state cache populated by the running application. In some other embodiments, information regarding current window display parameters is obtained from an operating system associated with a client device on which the native application is executing. The current version window display parameters may include, at a minimum, a current window display size, a current window display position, and a current window display layer. In some embodiments these parameters are maintained by a current version of the native application so that they may be provided to an updated version of the native application so that the current version can seamlessly hand over execution of the native application to the updated version.

Next, at step 506, the updated version of the native application is launched in a window having an updated size substantially the same as the current window display size, the window having an updated position substantially the same as the current window display position and an updated layer beneath the current window display layer. The positioning of the updated version of the native application may be based on the current version window display parameters.

Next, at step 508, the updated size and the updated position of the updated version of the native application are continuously updated, so that any viewable portion of the updated version of the native application remains hidden by the current version of the native application until execution can be handed over to the updated version of the native application.

Finally, at step 510, in response to detecting user inactivity in the current version of the native application, execution of the current version of the native application is terminated, so that the updated version of the native application becomes visible, thereby replacing the current version of the native application within the user interface environment. In some embodiments, prior to terminating execution of the current version of the native application, a modified screenshot of the current version of the native application is captured and momentarily displayed on the screen before replacing the current version of the native application within the user interface environment. In some such embodiments, the modified screenshot provides an indication that the current version of the native application is being updated, by, for example, rendering the screenshot with application of blurred image filter with an annotation such as "updating" or "application being updated."

In some embodiments, in order to provide a seamless update by preserving input state throughout the update process, the updated version of the native application subscribes to user input events received by the current version of the native application immediately before terminating execution of the current version, so the updated version of the native application reflects all user input events after the current version of the native application is replaced. User input events include keystrokes, mouse movements or other cursor movement events or touch screen events. User input events may also be composite input events, such as scrolling operations that may be performed due to a current cursor location and a scroll wheel input. Similarly scrolling may occur in connection with a swipe gesture or a multi-touch swipe gesture on a touch pad or a touch screen associated with the display.

In some embodiments, user inactivity is identified by detecting that the current version of the native application is displayed on an display device that is not currently selected. This may occur, for example, when the user clicks on a different application that is running on a separate monitor from the monitor on which the native application is currently being displayed. In this example, because the user is using a different monitor, a momentary flicker when the current version of the native application is replaced with the updated version will be effectively imperceptible to the user. In addition to the current application coming out of focus by user input being directed to a separate monitor, the current application may detect inactivity due to an extended period of overall inactivity of a particular client device, such that a screensaver or other screen lock is activate due to inactivity of the client device. In the case of overall inactivity, a screen lock may require the user to provide authentication information such as a PIN, a password, or a biometric authentication mechanism such as a fingerprint, iris, or facial recognition mechanism. During the time necessary for such an authentication procedure, the above-described native application update process may be seamlessly performed, the update being effectively imperceptible to the user.

In some other embodiments, user inactivity is identified by detecting that the current version of the native application is minimized or completely obscured by other windows. In this case, the client device is still in use and it is not a situation of general inactivity of the client device as described above. Nevertheless, the current version of the native application itself is known not to be in use by the user because the display of the native application is completely or substantially out of view of the user. In this case the update may be seamlessly performed without impacting a user experience associated with use of the native application. In still other embodiments, the application or operating system may determine (by way of, for example, a front-facing camera of a smartphone or a webcam of a desktop or laptop computer) that the user's gaze is directed away from the current version of the native application.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for seamlessly updating a current version of a native application with an updated version of the native application, the method comprising:
   in response to determining availability of an update to the current version of the native application, receiving a data package associated with the updated version of the native application, the data package comprising a new native application executable;
   accessing, from a user interface environment, current version window display parameters associated with the current version of the native application, the current version window display parameters including a current window display size, a current window display position, and a current window display layer;
   based on the current version window display parameters, launching the updated version of the native application in a window that is positioned beneath the current window display layer and not visible to the user; and
   in response to detecting user inactivity in the current version of the native application, terminating execution of the current version of the native application, so that the updated version of the native application becomes visible, thereby replacing the current version of the native application within the user interface environment.

2. The non-transitory computer-readable media of claim 1, wherein the data package further comprises updated application configuration information.

3. The non-transitory computer-readable media of claim 1, wherein terminating execution of the current version of the native application further comprises displaying an image comprising the current version of the native application before replacing the current version of the native application within the user interface environment, wherein the image provides an indication that the current version of the native application is being updated.

4. The non-transitory computer-readable media of claim 1, wherein the updated version of the native application subscribes to user input events received by the current version of the native application immediately before terminating execution of the current version so the updated version of the native application reflects all user input events after the current version of the native application is replaced.

5. The non-transitory computer-readable media of claim 1, wherein detecting user inactivity in the current version of the native application comprises detecting that the current version of the native application is out of view of the user.

6. The non-transitory computer-readable media of claim 5, wherein the window that is positioned beneath the current window display layer and not visible to the user has an updated size substantially the same as the current window display size, the window having an updated position substantially the same as the current window display position and an updated layer, and wherein the updated size and the updated position is continuously adjusted, so that any potentially viewable portion of the updated version of the native application remains hidden by the current version of the native application.

7. The non-transitory computer-readable media of claim 5, wherein detecting by way of the current version window display parameters indicate that the current version of the native application is out of view of the user comprises detecting that the current version of the native application is minimized or completely obscured by other windows.

8. A method for seamlessly updating a current version of a native application with an updated version of the native application, the method comprising:
 in response to determining availability of an update to the current version of the native application, receiving a data package associated with the updated version of the native application, the data package comprising a new native application executable;
 accessing, from a user interface environment, current version window display parameters associated with the current version of the native application, the current version window display parameters including a current window display size, a current window display position, and a current window display layer;
 based on the current version window display parameters, launching the updated version of the native application in a window that is positioned beneath the current window display layer and not visible to the user; and
 in response to detecting user inactivity in the current version of the native application, terminating execution of the current version of the native application, so that the updated version of the native application becomes visible, thereby replacing the current version of the native application within the user interface environment.

9. The method of claim 8, wherein the data package further comprises updated application configuration information.

10. The method of claim 8, wherein terminating execution of the current version of the native application further comprises displaying an image comprising the current version of the native application before replacing the current version of the native application within the user interface environment, wherein the image provides an indication that the current version of the native application is being updated.

11. The method of claim 8, wherein the updated version of the native application subscribes to user input events received by the current version of the native application immediately before terminating execution of the current version so the updated version of the native application reflects all user input events after the current version of the native application is replaced.

12. The method of claim 8, wherein detecting user inactivity in the current version of the native application comprises detecting that the current version of the native application is out of view of the user.

13. The method of claim 8, wherein the window that is positioned beneath the current window display layer and not visible to the user has an updated size substantially the same as the current window display size, the window having an updated position substantially the same as the current window display position and an updated layer, and wherein the updated size and the updated position is continuously adjusted, so that any potentially viewable portion of the updated version of the native application remains hidden by the current version of the native application.

14. The method of claim 13, wherein detecting by way of the current version window display parameters indicate that the current version of the native application is out of view of the user comprises detecting that the current version of the native application is minimized or completely obscured by other windows.

15. A system comprising at least one processor and at least one non-transitory memory storing computer executable instructions that when executed by the processor cause the system to carry out actions comprising:
 in response to determining availability of an update to a current version of a native application, receiving a data package associated with the updated version of the native application, the data package comprising a new native application executable;
 accessing, from a user interface environment, current version window display parameters associated with the current version of the native application, the current version window display parameters including a current window display size, a current window display position, and a current window display layer;
 based on the current version window display parameters, launching the updated version of the native application in a window that is positioned beneath the current window display layer and not visible to the user; and
 in response to detecting user inactivity in the current version of the native application, terminating execution of the current version of the native application, so that the updated version of the native application becomes visible, thereby replacing the current version of the native application within the user interface environment.

16. The system of claim 15, wherein the data package further comprises updated application configuration information.

17. The system of claim 15, wherein terminating execution of the current version of the native application further comprises displaying an image comprising the current version of the native application before replacing the current version of the native application within the user interface environment, wherein the image provides an indication that the current version of the native application is being updated.

18. The system of claim 15, wherein the updated version of the native application subscribes to user input events received by the current version of the native application immediately before terminating execution of the current version so the updated version of the native application reflects all user input events after the current version of the native application is replaced.

19. The system of claim 15, wherein detecting user inactivity in the current version of the native application comprises detecting that the current version of the native application is out of view of the user.

20. The system of claim 19, wherein the window that is positioned beneath the current window display layer and not visible to the user has an updated size substantially the same as the current window display size, the window having an updated position substantially the same as the current window display position and an updated layer, and wherein the updated size and the updated position is continuously adjusted, so that any potentially viewable portion of the updated version of the native application remains hidden by the current version of the native application.

* * * * *